United States Patent
Husa (10) Patent No.: US 8,621,216 B2
(45) Date of Patent: Dec. 31, 2013

(54) METHOD, SYSTEM AND DEVICE FOR SYNCHRONIZING BETWEEN SERVER AND MOBILE DEVICE

(75) Inventor: Knut Eilif Husa, Sande i Vestfold (NO)

(73) Assignee: enCap AS, Oslo (NO)

( * ) Notice: Subject to any disclaimer, the term of this patent is extended or adjusted under 35 U.S.C. 154(b) by 899 days.

(21) Appl. No.: 12/439,505

(22) PCT Filed: Aug. 31, 2007

(86) PCT No.: PCT/IB2007/002512
§ 371 (c)(1),
(2), (4) Date: Feb. 27, 2009

(87) PCT Pub. No.: WO2008/026060
PCT Pub. Date: Mar. 6, 2008

(65) Prior Publication Data
US 2010/0017604 A1  Jan. 21, 2010

Related U.S. Application Data

(60) Provisional application No. 60/841,205, filed on Aug. 31, 2006.

(51) Int. Cl.
*H04L 29/06* (2006.01)
*H04L 9/12* (2006.01)

(52) U.S. Cl.
USPC .......................................... 713/169; 380/260

(58) Field of Classification Search
None
See application file for complete search history.

(56) References Cited

U.S. PATENT DOCUMENTS

| | | | |
|---|---|---|---|
| 6,880,079 | B2 | 4/2005 | Kefford et al. |
| 2003/0163694 | A1 | 8/2003 | Chen et al. |
| 2006/0059344 | A1 | 3/2006 | Mononen |
| 2006/0069914 | A1 | 3/2006 | Rupp et al. |

(Continued)

FOREIGN PATENT DOCUMENTS

| | | |
|---|---|---|
| EP | 1650924 A1 | 4/2006 |
| JP | 2006004020 A2 | 1/2006 |

(Continued)

OTHER PUBLICATIONS

Whitepaper: "Open Specifications Integrate One-Time Passwords with Enterprise Applications", RSA Security, downloaded from http://www.rsasecurity.com/rsalabs/otps/datasheets/OTP_WP_0205.pdf, 10 pages.

(Continued)

*Primary Examiner* — Gilberto Barron, Jr.
*Assistant Examiner* — Izunna Okeke
(74) *Attorney, Agent, or Firm* — Osha Liang LLP (57) ABSTRACT

An arrangement and corresponding method for authentication synchronizing cryptographic key information between a server and a client device, via data signals, where the client device at least comprises one client. The server is at least configured to generate and send to the client device a current encryption key and a next encryption key. The client device is at least configured to encrypt information on the client device using the next encryption key and the client device is at least configured to return a correct One Time Password using the current encryption key. As a consequence of the received correct One Time Password the server then knows that the client has received the current encryption key, used it and stored the information with the next encryption key.

4 Claims, 5 Drawing Sheets

(56) References Cited

U.S. PATENT DOCUMENTS

| | | | |
|---|---|---|---|
| 2006/0136739 A1* | 6/2006 | Brock et al. | 713/184 |
| 2008/0137861 A1 | 6/2008 | Lindmo et al. | |
| 2009/0119759 A1 | 5/2009 | Taugbol | |

FOREIGN PATENT DOCUMENTS

| | | |
|---|---|---|
| NO | 20054549 | 4/2007 |
| WO | 02/43309 A | 5/2002 |
| WO | 03063411 A1 | 7/2003 |
| WO | 2004054297 A1 | 6/2004 |
| WO | 2006075917 A2 | 7/2006 |
| WO | 2007039806 A2 | 4/2007 |

OTHER PUBLICATIONS

Mobile One Time Passwords, Mobile-OTP v.1.06, "Strong, two-factor authentication with mobile phones," Aug. 17, 2006 6 pages downloaded from <http://motp.sourceforge.net/>, 6 pages.
NTT Data Corporation news release Apr. 24, 2006, "Mobile Phone Edition of RSA SecurID® Offers One-Time Password Authentication Using Cell Phones," downloaded from (<http://www.nttdata.co.jp/en/media/2006/042400.html>), 4 pages.
Vasco: Digipass GO3, "Ultra-portable, Strong Authentication for highest convenience and User Acceptability," downloaded from <http://www.vasco.com/documents/literature/pdf/GO3_lr.pdf>, 2 pages.
Nystrom, "The Protected One-Time Password Protocol (EAP-POTP)", Internet-Draft, RSA Security, Jun. 1, 2006, downloaded from <http://tools.ietf.org/id/draft-nystrom-eap-potp-05.txt> (80 pages).
Patent Abstracts for Norwegian patent No. 20054549, publication date Apr. 4, 2007 (1 page).
Whitepaper: "Open Specifications Integrate One-Time Passwords with Enterprise Applications", RSA Security, downloaded from http://www.rsasecurity.com/rsalabs/otps/datasheets/OTP_WP_0205.pdf, 10 pages, dated Feb. 2005.
Mobile One Time Passwords, Mobile-OTP v.1.06, "Strong, two-factor authentication with mobile phones," Aug. 17th, 2006 6 pages TPwnloaded from <http://motp.sourceforge.net/>, 6 pages.
NTT Data Corporation news release Apr. 24, 2006, "Mobile Phone Edition of RSA SecurID® Offers One-Time Password Authentication Using Cell Phones," downloaded from (<http://www.nttdata.co.jp/en/media/2006/042400.html>), 4 pages.
Vasco: Digipass GO3, "Ultra-portable, Strong Authentication for highest convenience and User Acceptability," downloaded from <http://www.vasco.com/documents/literature/pdf/GO3_lr.pdf>, 2 pages dated Feb. 7, 2003.
International Search Report issued in PCT/IB2007/002512, mailed on Jun. 12, 2008, 4 pages.
Written Opinion issued in PCT/IB2007/002512, mailed on Jun. 12, 2008, 5 pages.
Whitepaper: "Open Specifications Integrate One-Time Passwords with Enterprise Applications", RSA Security, downloaded from http://www.rsasecurity.com/rsalabs/otps/datasheets/OTP_WP_0205.pdf, dated Feb. 2005, 10 pages.
Mobile One Time Passwords, Mobile-OTP v.1.06, "Strong, two-factor authentication with mobile phones," Aug. 17th, 2006 6 pages downloaded from <http://motp.sourceforge.net/>, 6 pages.
NTT Data Corporation news release Apr. 24,2006, "Mobile Phone Edition of RSA SecurID® Offers One-Time Password Authentication Using Cell Phones," downloaded from (<http://www.nttdata.co.jplen/media/2006/042400.html>), 4 pages.
Vasco: Digipass GO3, "Ultra-portable, Strong Authentication for highest convenience and User Acceptability," downloaded from <http://www.vasco.com/documents/literature/pdf/G031r.pdf>, dated Feb. 7, 2003, 2 pages.

* cited by examiner

METHOD, SYSTEM AND DEVICE FOR SYNCHRONIZING BETWEEN SERVER AND MOBILE DEVICE

TECHNICAL FIELD

The present invention discloses an arrangement and a corresponding method for secure authentication for access to data resources and functions for digital signing of information and synchronizing cryptographic key information between a server and a client device. The present invention also discloses means for said secure authentication for access to data resources and functions for digital signing of information and synchronizing cryptographic key information between a server and a client device. It is also specified embodiments for a server and a client device.

BACKGROUND ART

One Time Password (OTP) devices and related algorithm for generating OTPs will normally use some means of synchronization mechanism with an OTP server. This implies that if an OTP has been accepted by the server it cannot be reused. Typically the OTP server accepts a certain range of OTPs from the One Time Password (OTP) devices (e.g.) 10 succeeding OTPs. If the OTP is outside of this range the One Time Password (OTP) device hereinafter the device will be locked. Synchronization in this respect is to be understood as a mechanism for the server to be updated with respect to status of key exchange for authentication of a client and/or the device.

Within the area of secure authentication and cryptography there is a number of papers and drafts disclosing protocols adapted for such use, examples of such papers and drafts are given at the end of the description under the sections for references together with examples of prior art of more general character within the same area.

The problem with the existing solutions is that an increasing OTP window decreases the security in the authentication mechanism. That is, the higher the number of succeeding OTP's that a client may submit without being locked out the lower is the security due for example to hackers, hence an increasing OTP window is undesirable. However, the OTP window cannot be too small since this effectively will make the mechanism inconvenient as the OTP device may get out of synchronization with the server when OTPs are generated that are not sent to the server. Go3 and digipass are examples of devices that generate a sequence of OTPs and where the OTP server synchronizes when the OTPs are submitted.

An object of the present invention is to provide a means for secure authentication without the conflicting problems referred to above with respect to "lack of synchronisation/ lack of possibilities for keying errors" vs. security.

DISCLOSURE OF INVENTION

The object of the invention is achieved according to the appended independent claims. More generally the invention discloses a method for, a system for, software for, signal for synchronizing cryptographic key information between a server and a client device. The cryptographic key information is used for locking and unlocking secret information stored on the client device that takes part in the generation of OTPs. OTP devices is one example of a usage area for the invention. There are a range of services where the method can be used to synchronize a client with a server. Another example of application is for client storage of an electronic cash wallet. The client device can for example be a mobile phone (example used in this description), other devices can also be envisaged, for example a PC, a laptop computer, a PDA, a camera, or any electronic device with processing and storage capacity.

In another aspect of the invention is a client device for secure authentication acting as a client in a client server arrangement specified where the server is at least configured to send a current encryption key and to send a next encryption key to the client device.

The client is at least configured to encrypt information using the next encryption key and to store information with the next key and the device is further at least configured to return at least one correct One Time Password using the current key. The client device is further configured to request encryption keys from the server. The state of the client device is unknown to the server and the server is at least configured to send at least two encryption keys to the client device, and the client device is configured to generate two One Time Passwords as a response using the two received encryption keys. The client device is still further at least configured to receive the current encryption key and the next encryption key the encryption keys being adapted to encrypt and store the information on the client device and the client device is configured to return a correct One Time Password to the server.

In another aspect of the present invention it is disclosed a server for secure authentication in a client server arrangement where the server is at least configured to generate and send to the client device a current encryption key and a next encryption key. The server is at least configured to receive at least one One Time Password generated by the client device using the current encryption key to decrypt information, and the server is at least configured to verify that the client device has received the next encryption key, used it and stored the encrypted information. The server is further configured to generate two One Time Passwords when the server is enquired from the client device for encryption keys, and the state of the client device is unknown to the server. The server is still further at least configured to send the two generated passwords to the client device.

In another aspect of the present invention it is disclosed an arrangement for authentication synchronizing cryptographic key information between a server and a client device where the server is at least configured to generate and send to the client device a current encryption key and a next encryption key. The client device is at least configured to encrypt information on the client device using the next encryption key and the client device is at least configured to return a correct One Time Password using the current encryption key. As a consequence the server then knows that the client has received the current encryption key, used it and stored the information with the next encryption key. The arrangement is further specified in that the client device is at least configured to request encryption keys from the server. The server is at least configured to respond by generating and sending a candidateKey1 and candidateKey2 to the client device if it is unknown to the server which one of the current encryption key or next encryption key that is used for encryption of information at the client device. The client device is further at least configured to generate two One Time Passwords, one using the candidateKey1 and one using the candidateKey2 and the information on the client device is not being encrypted with a new encryption key.

In yet another aspect of the present invention it is disclosed a method for synchronizing cryptographic key information between a server and a client device comprising at least the steps of:

a) delivering from the server a current encryption key and a next encryption key usable to encrypt information on the client device,
b) receiving the current encryption key and the next encryption key at the client device,
c) encrypting information on the client device using the next encryption key, generating at least one One Time Passwords at the client device using the current encryption key,
d) sending from the client device the at least one correct One Time Password, and
e) confirming at the server that the client device has received the current encryption key, used it and stored the information with the next encryption key. The method may further comprise the steps of:
   the client device requests encryption keys from the server,
   the server is responding by generating and sending a candidateKey1 and candidateKey2 to the client device if it is unknown to the server which one of the current encryption key or next encryption key that is used for encryption of information on the client device, and
   the client device is at least generating two One Time Passwords, one using the candidateKey1 and one using the candidateKey2 and the information on the client device is not being encrypted with a new encryption key.

In still another aspect of the present invention it is disclosed at least one computer program for synchronizing cryptographic key information between a server and a client device, the client device comprising at least one client where a server part computer program is at least configured to send a current encryption key and a next encryption key to a client part computer program usable to encrypt information by the client part computer program. The client part computer program is at least configured to return a correct One Time Password, and the server part computer program is then at least configured to confirm that the client has received the current encryption key, used it and stored the information with the next encryption key. The client part program is further at least configured to request encryption keys from the server part programs. As a response the server part program is further at least configured to generate and send a candidateKey1 and candidateKey2 to the client part computer program if it is unknown to the server part program which one of the current encryption key or next encryption key that has been used for encryption of information by the client part computer program. The client part computer program is further at least configured to generate two One Time Passwords, one using the candidateKey1 and one using the candidateKey2 and the information on the client device is not being encrypted with a new encryption key.

In still another aspect of the present invention it is disclosed computer data signals for synchronizing cryptographic key information sent between a server and a client device where the server sends at least a current encryption key and a next encryption key usable to encrypt information on the client device via the computer data signal, and the client device responds by returning at least one correct One Time Password via Computer data signals, and the server then knows that the client device has received the current encryption key, used it and stored the information with the next encryption key. Alternatively if the server is in a state where it is unknown which one of the previous delivered encryption keys, current encryption key or next encryption key, that is used for encryption of secret information, both encryption keys are at least sent to the client device in a computer data signal, and the client device generates at least two One Time Passwords, one using a candidateKey1 and one using a candidateKey2 and information on the client device is not being encrypted with a new encryption key.

Other advantageous aspects according to the present invention will become apparent by the appended dependent claims, supported by the description and the drawings.

BRIEF DESCRIPTION OF DRAWINGS

For ease of understanding the present invention, reference is made to the following description and to the accompanying drawings wherein.

MODE(S) FOR CARRYING OUT THE INVENTION

For ease of understanding the present invention will now be described with reference to the figures. The figures are only included for illustrative purposes and are not meant to restrict the scope of protection, a person skilled in the art will appreciate other advantageous solutions as disclosed by the appending claims or as indicated by the description below.

In the following the wording device or OTP device should be interpreted as any device capable of embedding a client adapted for OTP authentication against an OTP server.

The OTP server can be any suitable computing device with storage means and an interface adapted for communication with an OTP device and with capabilities to generate OTP.

In the following the present invention is used in exemplified embodiments for illustrative purposes of an OTP application, for example in combination with the technology described in WO06075917A2 or NO20054549.

Figure 1:
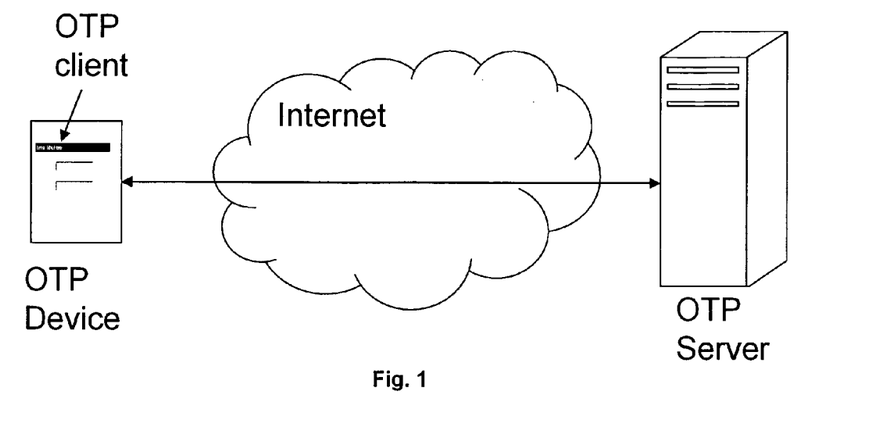
FIG. 1 shows a system according to the present invention
Figure 2:
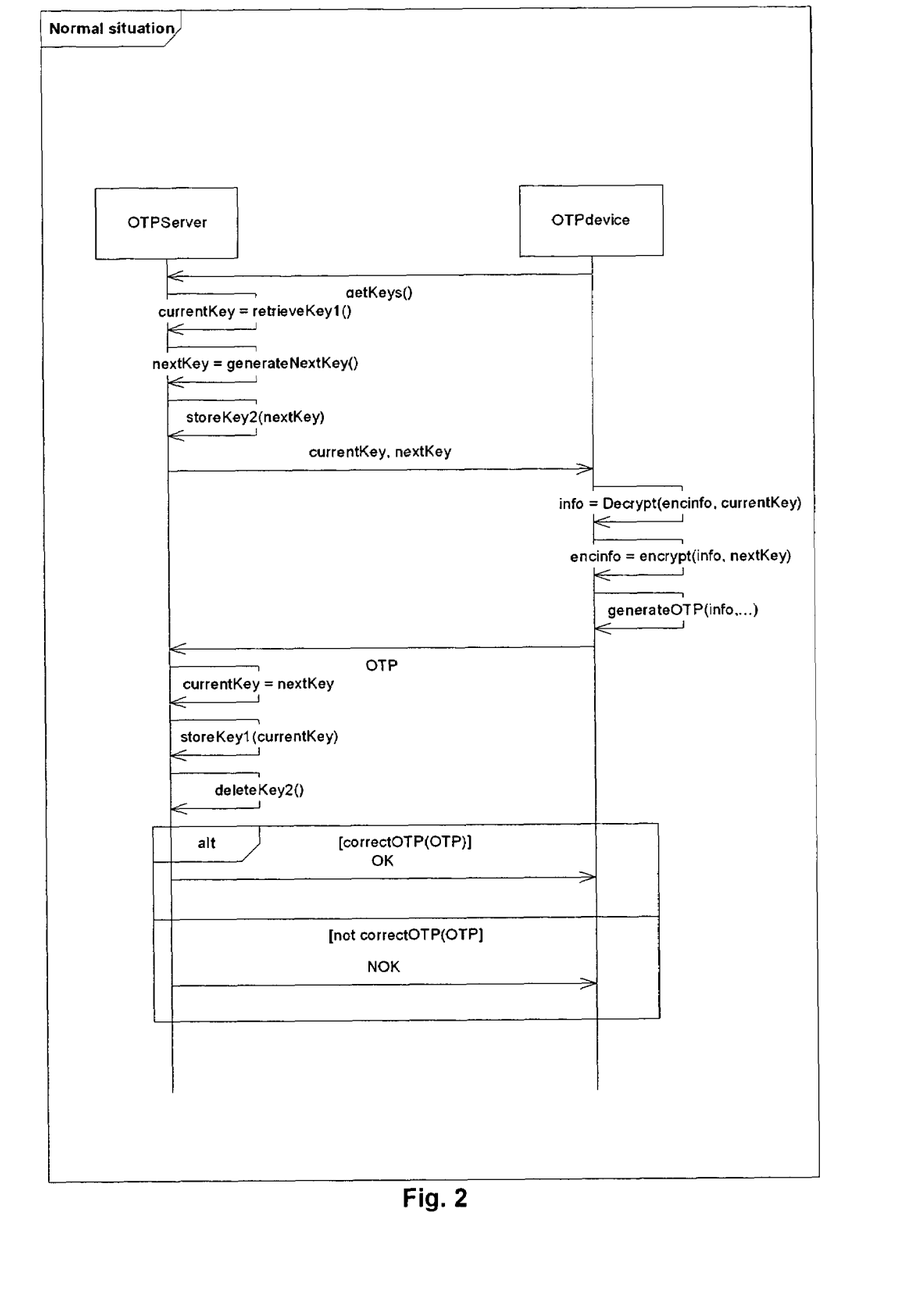
FIG. 2 depicts a normal scenario for key exchange.

Firstly a scenario with normal key exchange is disclosed, with reference to and FIG. 2. The alt box in the figure indicates a number of alternatives distinguished by the horizontal line in the box, hence the alternative above OR underneath the level line is chosen it is not an and/or option.

Every time an OTP device queries an OTP server for at least one key needed to decrypt secret information, the server delivers the current encryption key. It also delivers the next encryption key that will be used to encrypt the information on the mobile device. When the mobile device returns with a correct OTP, the server knows that the device has received the current key, used it and stored the information with the next key. This situation is described in FIG. 2.

Note that the principle behind exchange of keys according to the present invention relies on a dynamic stepwise OTP generation, namely a present/current and a next OTP principle thus giving a very small OTP window, this is in contrast with the widely used window of 10 succeeding OTP's. The principle of a current and next OTP ensures, as will be described below, synchronisation even with network failures and it is further less prone to tampering than the system and methods according to prior art. Furthermore as is indicated there is no need to use acknowledges in the interface between the OTP device and the server.

One Mode for Carrying Out the Invention

Figure 3:
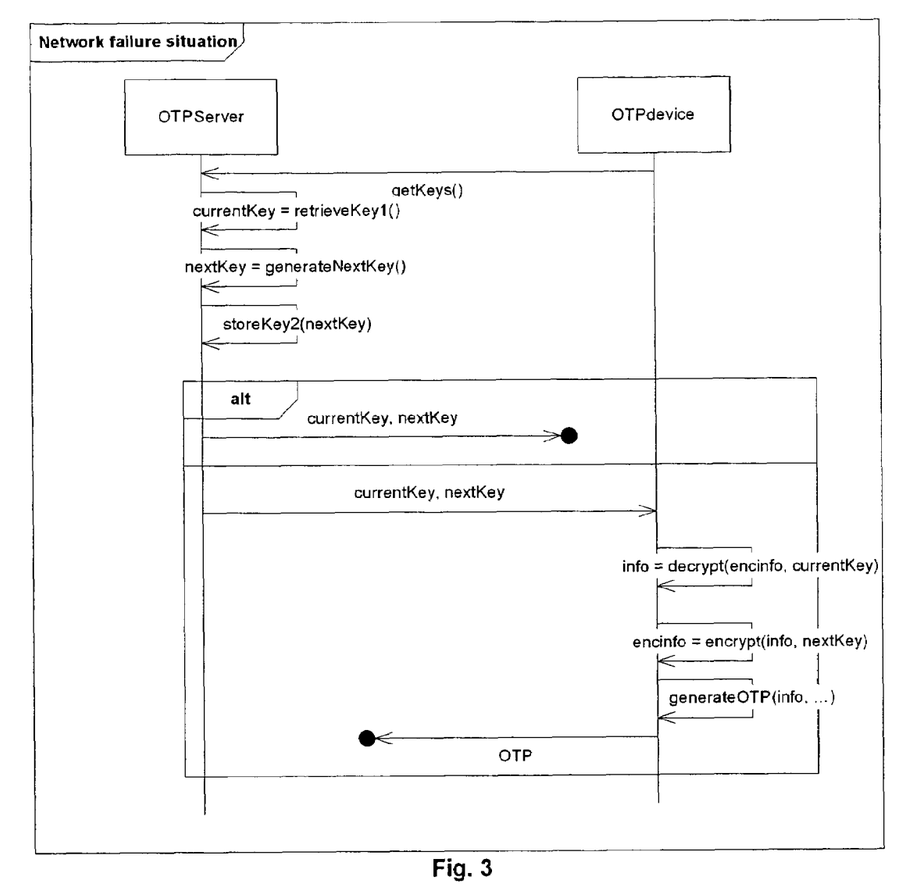
FIG. 3 shows a network failure situation.

There are, however, situations where the key exchange mail fail due to unreliable network connections as described in FIG. 3. This diagram depicts a situation where the OTP device requests key information from the server. The server replies with the current and next key. However, the network connection is broken such that the keys never reach the OTP device. It may also occur that the network connection is broken when the OTP device submits the OTP back to the server as described in the second operand of the alt fragment.

From the server instance these two situations are equivalent. The server sends key information, but gets no reply back. The result is that the server cannot know which one of the two situations described in FIG. 3 that has occurred. The server does not know whether the current key or the next key has been used for encrypting the secret information. In fact the lack of knowledge is among others the consequence of, as indicated above, that there is no exchange of acknowledge messages which simplify the interface as well as reduces the traffic load.

Another Mode for Carrying Out the Invention

Figure 4:
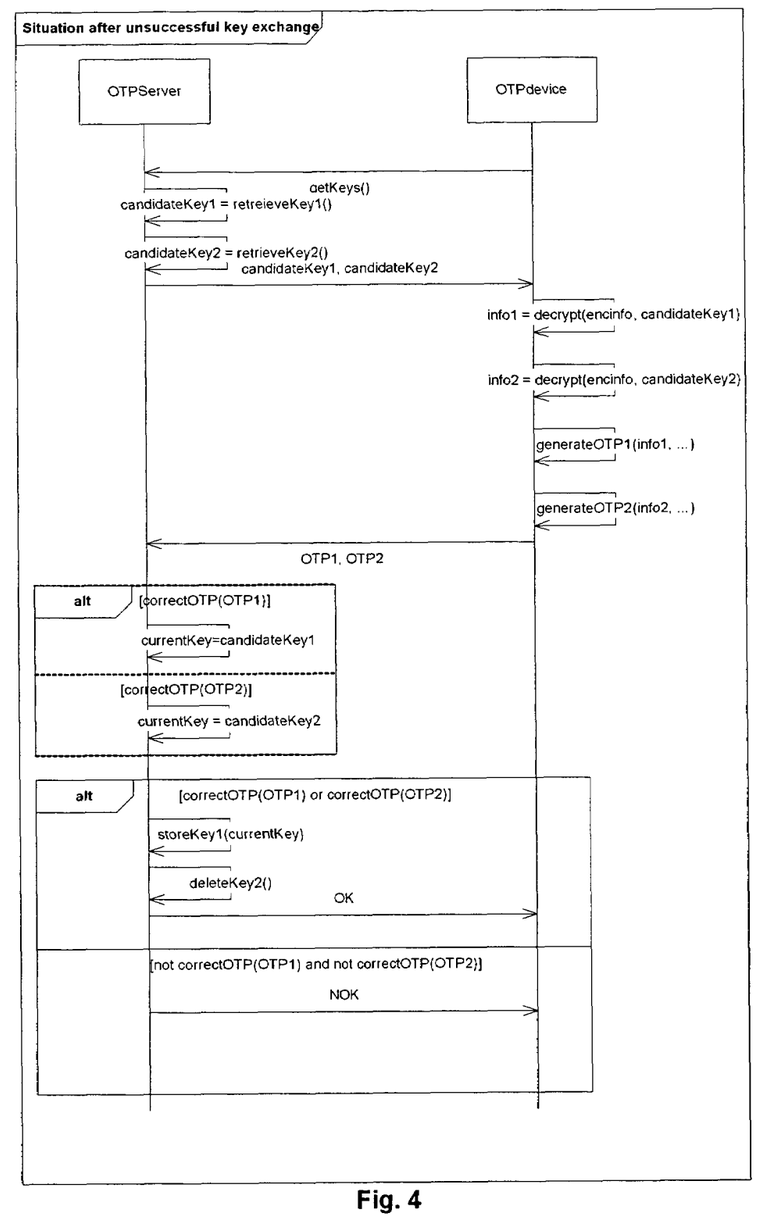
FIG. 4 shows a situation after an unsuccessful key exchange has occurred.

FIG. 4 shows the action that has to be taken to synchronize the server and the device after a scenario with an unsuccessful key exchange such as were network failures has occurred.

When the OTP device queries the OTP server for the keys, and in addition the OTP server is in a state where it is unknown which one of the previous delivered keys (currentKey or nextKey in FIG. 3) that is used for encryption of the secret information denoted the unknown state, both keys are delivered to the OTP device. Further, the OTP device is now obliged to generate two OTPs, one using the candidateKey1 (former currentKey) and one using the candidateKey2 (former nextKey). The information on the device is not being encrypted with a new key this time. If one of the two OTPs is accepted, the system is synchronized. The server then knows which one of the keys (candidateKey1 or candidateKey2) that are used to encrypt the information on the device. This key will be denoted as the currentKey on the next key query.

In this example it is shown that synchronisation is achieved even though only two OTP's are sent by the OTP server at each session as opposed to what is common according to the prior art.

Another Mode for Carrying Out the Invention

Figure 5:
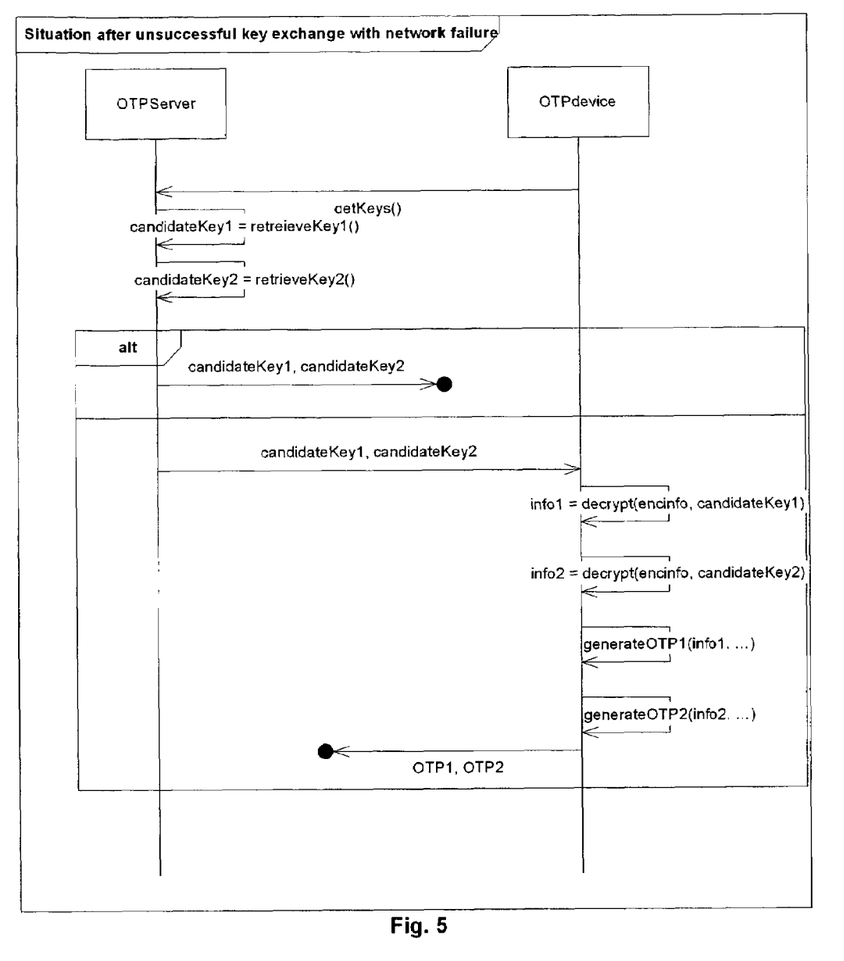
FIG. 5 shows a situation after unsuccessful key exchange with network failure.

FIG. 5 shows a scenario were subsequent network failures occurs. In this case neither the state on the server or the client will change. Thus, this scenario may happen in between FIG. 3 and FIG. 5.

Advantages

Using an encrypted storage on OPT devices such as hand-held devices, mobile phones etc. makes the device less prone for hacking.

By also changing the encryption key each time the device is used also makes cloning very difficult. Since the key changes every time the device is used, a potential clone of the device will very soon be outdated. On the other side, if a clone has been misused, the correct device will realize this on usage, since its key information is not correct anymore.

Only two candidate OTPs are needed in this solution. This makes the security high compared to solutions where a larger range of OTPs are allowed.

In the description above examples of a method and a system for exchange of keys according to the present invention has been disclosed, it should however be appreciated that any combination of the disclosed modes, the disclosed drawings or the appended claims are within the scope of protection and spirit of the present invention.

References

The Protected One-Time Password Protocol (EAP-POTP), Internet-Draft, RSA Security, 2006-06-01, M. Nyström;

Whitepaper: Open Specifications Integrate One-Time Passwords with Enterprise Applications at http://www.rsasecurity.com/rsalabs/otps/datasheets/OTP_WP_0205.pdf;

Mobile One Time Passwords, Mobile-OTP v.1.06, strong, two-factor authentication with mobile phones. Aug. 17, 2006 at http://motp.sourceforge.net/;

NTT DATA Corporation news release Apr. 24, 2006 Mobile Phone Edition of RSA SecurID® Offers One-Time Password Authentication Using Cell Phones (http://www.nttdata.co.jp/en/media/2006/042400.html);

Vasco: Digipass GO3 at http://www.vasco.com/documents/literature/pdf/GO3_lr.pdf, US20060136739A1: Method and apparatus for generating one-time password on hand-held mobile device;

US20030163694A1: Method and system to deliver authentication authority web services using non-reusable and non-reversible one-time identity codes;

EP1650924A1 Method of authenticating user to network e.g. internet protocol-based virtual private network, involves transmitting temporary password generated in response to assertion of access request, to mobile telecommunication device;

US20060069914A1 Network user authenticating method involves providing temporary password to user mobile communication terminal from service provider upon asserting user access request;

JP2006004020A2 One time password-type authentication system for communication network, has server that receives one time key from communication terminal and compares with prestored key, to permit or deny login of data access, accordingly;

WO04054297A1 One-time password generator for mobile telephones has secret data stored on SIM card or equivalent microchip cards to generate passwords using secret key;

U.S. Pat. No. 6,880,079 Secure information transmission method in electronic transactions, involves encrypting reply for request using received encryption key and sending encrypted reply to mobile device identified using received unique identifier;

WO03063411A1 Bank/business services terminal improved authentication process having user personal secret code information terminal limited time interpreted and private key input/authorising/decoding password providing information system access;

WO03063411A1 Bank/business services terminal improved authentication process having user personal secret code information terminal limited time interpreted and private key input/authorising/decoding password providing information system access.

The invention claimed is:

1. A client device for synchronizing cryptographic key information in a client server arrangement, comprising:
a processor and a memory, wherein
the client device is configured to receive a current encryption key and to receive a next encryption key from a server, and
the client device is configured to encrypt information using the next encryption key and to store the encrypted information with the next encryption key,
the client device is configured to return at least one One Time Password using the current encryption key,
the client device is further configured to request encryption keys from the server, a state of the client device is not communicated to the server, and the client device is configured to receive at least two encryption keys from the server, and the client device is configured to generate two One Time Passwords as a response using the at least two encryption keys received from the server.

2. The client device of claim 1, wherein the client device is configured to receive the current encryption key and the next encryption key, the encryption keys are used to encrypt the information, to obtain the encrypted information, and store the encrypted information on the client device, and wherein the client device is configured to return a One Time Password to the server.

3. A server for synchronizing cryptographic key information in a client server arrangement, comprising:

a processor and a memory, wherein the server is configured to generate and send, to a client device, a current encryption key and a next encryption key, the server is configured to receive at least one One Time Password generated by the client device using the current encryption key to decrypt information, the server is configured to verify that the client device has received the next encryption key, used the next encryption key to encrypt information, and stored the encrypted information, the server is further:

configured to respond, to the request for encryption keys, by generating and sending a candidateKey1 and candidateKey2 to the client device when the server does not include information about which encryption key selected from a group consisting of the current encryption key and the next encryption key is being used by the client device to encrypt information at the client device, and configured to receive from the client device two One Time Passwords generated by the client device by using the respective ones of the candidateKeys sent from the server.

4. A method for synchronizing cryptographic key information between a server and a client device, comprising:

delivering, from the server, a current encryption key and a next encryption key usable to encrypt information on the client device, receiving, from the server, a current encryption key and a next encryption key at the client device, encrypting information on the client device using the next encryption key, generating at least one One Time Passwords at the client device using the current encryption key, and sending from the client device the at least one One Time Password to the server, wherein the server is configured to confirm that the client device has received the current encryption key, used the current encryption key to encrypt information and stored the encrypted information with the next encryption key based upon receipt of the One Time Password, requesting, by the client device, encryption keys from the server, wherein the server upon receipt of the request is configured to generate and send a candidateKey1 and candidateKey2 to the client device when the server does not include information about which encryption key selected from a group consisting of the current encryption key and the next encryption key was used by the client device to encryption of information at the client device, and generating, by the client device, at least a first One Time Password using the candidateKey1 and a second One Time Password using the candidateKey2 when the information on the client device is not being encrypted with a new encryption key.

* * * * *